US010666873B2

United States Patent
Bouzaraa et al.

(10) Patent No.: US 10,666,873 B2
(45) Date of Patent: May 26, 2020

(54) EXPOSURE-RELATED INTENSITY TRANSFORMATION (71) Applicant: Huawei Technologies Co., Ltd., Shenzhen (CN)

(72) Inventors: Fahd Bouzaraa, Munich (DE); Onay Urfalioglu, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 15/954,941

(22) Filed: Apr. 17, 2018

(65) Prior Publication Data

US 2018/0241929 A1   Aug. 23, 2018

Related U.S. Application Data (63) Continuation of application No. PCT/EP2016/064060, filed on Jun. 17, 2016.

(51) Int. Cl.
*H04N 5/235* (2006.01)
*H04N 5/232* (2006.01)
*G06K 9/62* (2006.01)
*G06T 5/50* (2006.01)
*G06T 5/00* (2006.01)

(52) U.S. Cl.
CPC ............ *H04N 5/2355* (2013.01); *G06K 9/627* (2013.01); *G06T 5/009* (2013.01); *G06T 5/50* (2013.01); *H04N 5/2353* (2013.01); *H04N 5/23229* (2013.01); *H04N 5/23277* (2013.01); *G06T 2207/20021* (2013.01);

(Continued)

(58) Field of Classification Search
CPC ............ H04N 5/2355; H04N 5/23277; H04N 5/2353; H04N 5/23229; G06T 5/009; G06T 5/50; G06T 2207/20021; G06T 2207/20084; G06T 2207/20081; G06T 2207/20208; G06K 9/627

See application file for complete search history.

(56) References Cited

U.S. PATENT DOCUMENTS 6,822,762 B2   11/2004 Moroney et al.
2010/0246940 A1   9/2010 Lin
(Continued)

FOREIGN PATENT DOCUMENTS

EP   1014687 A2   6/2000

OTHER PUBLICATIONS

Stephen Mangiat et al., "Automatic Scene Relighting for Video Conferencing" in ICIP'09 Proceedings of the 16th IEEE International Conference on Image Processing, pp. 2781-2784, 2009 (Year: 2009).*

(Continued)

*Primary Examiner* — Jason A Flohre
(74) *Attorney, Agent, or Firm* — Conley Rose, P.C.

(57) ABSTRACT

An image processing device for generating an output image front an input image of a scene, the input image being the first image and the output image being the second image, the output image corresponds to an exposure that is different from an exposure of the input image, the image processing device comprising an intensity transformer that is configured to determine one or more intensities of an output pixel of the output image based on an input patch around an input pixel of the input image that corresponds to the output pixel.

19 Claims, 7 Drawing Sheets

(52) U.S. Cl.
CPC ........... G06T 2207/20081 (2013.01); G06T 2207/20084 (2013.01); G06T 2207/20208 (2013.01)

(56) References Cited

U.S. PATENT DOCUMENTS

| | | | |
|---|---|---|---|
| 2012/0307116 A1* | 12/2012 | Lansel | H04N 9/045 348/273 |
| 2014/0152848 A1* | 6/2014 | Cox | H04N 5/3572 348/207.1 |
| 2015/0235399 A1* | 8/2015 | Shechtman | G06T 5/005 345/639 |
| 2017/0185871 A1* | 6/2017 | Zhang | G06N 3/0454 |
| 2017/0272619 A1* | 9/2017 | Finlayson | H04N 9/64 |

OTHER PUBLICATIONS

Scharstein, D., et al., "A Taxonomy and Evaluation of Dense Two-Frame Stereo Correspondence Algorithms," IEEE Workshop on Stereo and Multi Baseline Vision, 2001, 35 pages.

Pitie, F., et al., "Automated colour grading using colour distribution transfer," Computer Vision and Image Understanding, vol. 107, 2007, pp. 123-137.

Reinhard, E., et al., "Color Transfer between Images," Applied Perception, Sep./Oct. 2001, pp. 34-41.

Xiao, X., et al., "Color Transfer in Correlated Color Space," VRCIA 2006, Jun. 14-17, 2006, pp. 305-309.

Gonzalez, R., et al., "Digital Image Processing," Third Edition, Library of Congress Cataloging-in-Publication Data on File, 2008, 122 pages.

Mertens, T., et al., "Exposure Fusion," In Pacific Graphics, 2007, 9 pages.

Xiao, X, et al., "Gradient-Preserving Color Transfer," Computer Graphics Forum, Dec. 2, 2009, 2 pages.

Dong, C., et al., "Learning a Deep Convolutional Network for Image Super-Resolution," ECCV 2014, Part IV, LNCS 8692, 2014, pp. 184-199.

Tai, Y., et al., "Local Color Transfer via Probabilistic Segmentation by Expectation-Maximization," The Research Grant Council of Hong Kong Special Administration Region, 2005, 8 pages.

"Neural Networks and Deep learning," http://neuralnetworksand-deeplearning.com/chap6.html, downloaded Apr. 18, 2018, 57 pages.

Pouli, T., et al., "Progressive Histogram Reshaping for Creative Color Transfer and Tone Reproduction," NPAR 2010, Jun. 7-10, 2010, 10 pages.

Dettmers, T., "Understanding Convolution in Deep Learning," http://timdettmers.com/2015/03/26/convolution-deep-learning/, Mar. 26, 2015, 77 pages.

Battiato, S., et al., Chapter 12: "Exposure Correction for Imaging Devices: An Overview," XP055343902, In:"Single-Sensor imaging:methods and applications for digital cameras," Sep. 9, 2008, pp. 323-350.

Yan, Z., et al., "Automatic Photo Adjustment Using Deep Neural Networks," XP055344032, ACM Transactions on Graphics(TOG), vol. 35, No. 2, Feb. 11, 2016, 16 pages.

Foreign Communication From A Counterpart Application, PCT Application No. PCT/EP2016/064060, International Search Report dated Feb. 27, 2017, 8 pages.

Foreign Communication From A Counterpart Application, PCT Application No. PCT/EP2016/064060, Written Opinion dated Feb. 27, 2017, 9 pages.

* cited by examiner

EXPOSURE-RELATED INTENSITY TRANSFORMATION

CROSS-REFERENCE TO RELATED APPLICATION

This application is a continuation of International Application No. PCT/EP2016/064060, filed on Jun. 17, 2016, the disclosure of which is hereby incorporated by reference in its entirety.

TECHNICAL FIELD

The present disclosure relates to an image processing device for generating from an input image an output image, wherein the output image corresponds to an exposure that is different from an exposure of the input image. The present disclosure also relates to an image transformation learning device, a method for learning an intensity transformation and a method for generating an output image from an input image.

The present disclosure also relates to a computer-readable storage medium storing program code, the program code comprising instructions for carrying out the above methods.

BACKGROUND

In photography, exposure refers to the amount of light gathered by the capturing device. Different exposure levels thus typically generate different image intensities in that a low-exposed image appears to be dark and a high-exposed image appears to be bright. In some applications, it may be desirable to have images which correspond to different exposures. For example, in high dynamic range (HDR) imaging, images with different exposures can be combined to obtain a HDR image which has a higher dynamic range than is possible with standard imaging or photographic techniques. For this purpose, more than one image has to be acquired with the imaging device, which makes the image acquisition more time-consuming and complicated.

For HDR imaging and other applications there is thus a need for determining an output image from an input image, wherein the output image corresponds to a different exposure than the input image.

A change of exposure can affect, for example, intensities in a gray scale image or color components in a color image. Color consistency between a set of color input images is crucial for a variety of applications in computer graphics and image processing. This is especially the case when the application at hand is based on the assumption that the input images have the same color properties in terms of pixel intensities.

In the following, exposure conversion is any technique in which an input image corresponding to a certain exposure (first exposure) is transformed into an output image corresponding to an exposure (second exposure) different from the first exposure. The input image and the output image may be gray-scale images or color images.

The problem of exposure conversion is quite common in computer vision and computational photography, where multiple images with different exposures are used in order to increase the quality of a photograph, or to detect the geometry of the scene. Typical challenges addressed by exposure conversion are the elimination of the color differences in scenes which differ in content due to camera and/or scene-related motion.

The spectrum of such applications ranges from object tracking and identification using stereo or multi-camera systems, to image and panorama stitching, image retrieval, face and object recognition, pedestrian and car detection, motion estimation and compensation, stereo matching and disparity map computation, inter-frame color consistency in the context of video enhancement. For these applications, color dissimilarity can be caused by varying illumination conditions during the capturing process, different intrinsic parameters (exposure settings, sensor sensitivity) and radiometric properties of the cameras or simply different capturing times. This unintentional color difference is typical for multi-camera systems such as stereo and multi-view setups.

However, in some other scenarios, the nature of the application imposes an inherent radiometric variation between the input images. This is especially the case for high dynamic range imaging (HDRI), where the input Low Dynamic Range (LDR) images are differently exposed, ranging from under-exposure (dark images) to over-exposure (bright with saturated areas). The input LDRs are subsequently merged into one single HDR image with a greater dynamic range. This technique requires the LDRs to be aligned, in order to cover the Camera Response Function (CRF) or perform Exposure Fusion (EF). However, in most cases, motion introduced by the capturing device or the scene itself violates this assumption. This calls for motion compensation, which in turn depends on the initial exposure conversion between the input LDRs.

SUMMARY

The objective of the embodiment of the present disclosure is to provide an image processing device and an image transformation learning device, wherein the image processing device and the image transformation learning device overcome one or more of the above-mentioned problems of the prior art.

A first aspect of the embodiment of the disclosure provides an image processing device for generating from an input image, which is a first image of a scene, an output image, which is a second image of the scene, wherein the output image corresponds to an exposure that is different from an exposure of the input image, the image processing device comprising an intensity transformer that is configured to determine one or more intensities of an output pixel, which is a pixel of the output image, based on an input patch, the input patch comprising an input pixel and one or more further pixels of the input image, the input pixel being is a pixel of the input image that corresponds to the output pixel.

The input pixel of the input image can be seen as corresponding to the output pixel of the output image if they have the same position within the images. In this sense, a pixel with position (x, y) of the input image corresponds to a pixel with the same position (x, y) of the output image. In an embodiment, input image and output image have a same image resolution and input pixel and corresponding output pixel have the same pixel position. In other embodiments, input image and output image might have different resolutions, but pixels could still be considered as corresponding based on a coordinate mapping that maps positions in one of the images to corresponding positions in the other image.

The intensity transformer of the image processing device of the first aspect can use information from two or more pixels of the input patch to determine the one or more intensities of the output pixel. Thus, the intensity transformer is not limited to a simple scalar mapping of input intensities to output intensities. Rather, it can use higher-dimensional information (for example, textures) to determine the intensities in the output image. Experiments have shown that this allows generating an output image even when simple intensity-mapping approaches (for example, a linear mapping of intensities in the input image to intensities in the output image) fail.

In other words, the image processing device of the first aspect provides an exposure conversion procedure in which one or more neighbouring pixels of each pixel are taken into account. The neighbourhood of each pixel provides additional knowledge which helps to accurately estimate one or more intensities of the output image. The image processing device can be used, in particular, to adjust the colors of an input image to a target color distribution that corresponds to a different exposure setting.

The intensity transformer can implement a transformation that is learned from training images, for example from pairs of source and target images, wherein the source image has been acquired with a first exposure and the target image has been acquired with a second exposure.

The image processing device of the first aspect can use a model which incorporates the pixel neighbourhood, for example, by learning an end-to-end non-local mapping. In contrast to existing algorithms for exposure conversion, the proposed approach relies neither on geometric correspondences nor on their statistics such as histograms, and it can be implemented using a relatively simple algorithm.

In a first implementation of the image processing device according to the first aspect, the intensity transformer is configured to determine the one or more intensities of the output pixel using intensity transformation data that has been generated by training a machine learning predictor with source patches from a plurality of source training images and target patches from a corresponding plurality of target training images, wherein a ratio between the exposure of the input image and the exposure of the output image corresponds to a ratio between exposures of the source training images and exposures of the target training images.

The intensity transformation data can be, for example, parameters that specify the intensity transformation of the intensity transformer. In particular, the intensity transformation data can comprise weight and bias values of a neural network.

In a second implementation of the image processing device according to the first aspect as such or according to the first implementation of the first aspect, the intensity transformer comprises a convolutional neural network, also referred to as convolutional network (CNN).

Convolutional neural networks are a popular deep learning tool in the context of machine learning. The introduction of convolution in at least one layer of the CNN enables modeling high-level abstractions using relatively few connections and parameters for the training. Based on the training set, which is a set of differently exposed images having a fix exposure ratio R, the CNN is able to learn the intensity mapping which corresponds to ratio R. During the application phase, the obtained model is used to perform exposure conversion on an input image with exposure e_in. The resulting color mapped image has an exposure value e_out so that (e_in/e_out)=R (or (e_out/e_in)=R).

Using the CNN, the intensity transformation, to be carried out by the intensity transformer, can be learned from training images, and the image processing device has to rely neither on geometrical correspondence nor on statistical properties. This means that during the application phase, there is no need for a target image.

Preferably, network parameters of the CNN can be adapted during the training phase to an exposure ratio R.

In a third implementation of the image processing device according to the first aspect as such or according to any of the preceding implementations of the first aspect, the input patch consists of the input pixel and its closest neighbors up to and including its N-th closest neighbors, wherein N is a predetermined number greater than 1.

Having a patch that comprises the input pixel and its closest neighbors is advantageous because these pixels can be most informative about pixel intensities in the output image.

In a fourth implementation of the image processing device according to the first aspect as such or according to any of the preceding implementations of the first aspect, the image processing device further comprises a HDR image generator configured to generate an HDR image based on the input image and the output image.

Generating a HDR image typically requires two or more images that were acquired with different exposures. Thus, the image processing device of the third implementation has the advantage that it can generate an HDR image based only on one input image by using the input image and the output image as input for an HDR image generation algorithm.

In a fifth implementation of the image processing device according to the first aspect as such or according to any of the preceding implementations of the first aspect, the image processing device is configured to generate a darker output image which corresponds to a shorter exposure time than the input image and a brighter output image which corresponds to a longer exposure time than the input image.

The fifth implementation is of particular relevance for single image HDR. The underlying concept is to create several instances of an input LDR image. The resulting set of images can for example have different color properties depending, for example, on the exposure ratio to which every model was trained. The set of gained images and the input LDR can be merged in order to create an HDR image of the initial LDR image. To this end, multiple techniques could be deployed such as camera response function-based HDR or EF. In addition, the proposed CNN-based exposure conversion can be applied in other scenarios, such as stereo matching and motion estimation via Optical Flow.

In a sixth implementation of the image processing device according to the first aspect as such or according to any of the preceding implementations of the first aspect, the output pixel comprises intensities which correspond to color components of the output pixel, and the intensity transformer is configured to determine each of the intensities of the output pixel separately based on intensities corresponding to all color components of the pixels of the input patch around the input pixel.

The different color components of input pixels of the input image can all have relevance for generating the output image. Hence it can be advantageous to make use of all color components of the input image.

In an embodiment, the intensity transformer comprises individual intensity transformers that separately determine the intensities of the color components of the output image. For example, each of the individual intensity transformers can make use of all color components of the input image. The color components of the input image can correspond for example to red, green and blue (RGB) or to cyan, magenta, yellow, and black (CMYK).

In a seventh implementation of the image processing device according to the first aspect as such or according to any of the preceding implementations of the first aspect, the image processing device further comprises a transformer selection unit configured to select a preferred intensity transformer from a plurality of intensity transformers based on exposure settings of the input image.

Selecting a preferred intensity transformer can be implemented, for example, as retrieving the preferred intensity transformer from a memory, for example, a programmable memory in a digital camera or in a scanning device.

In particular, the preferred intensity transformer can be selected based on exposure settings or exposure parameters, such as exposure value (EV) and international organization of standardization (ISO) of a digital camera or similar parameters of a scanning device. Exposure settings of an input image can be retrieved, for example, from exchangeable image file format (EXIF) data stored in the image file.

The preferred intensity transformer can also be selected based on exposure settings or exposure parameters, such as EV and ISO of the output image (for example, the desired output exposure settings). Preferably, the output exposure settings can be defined by a user or by an algorithm.

Further, the preferred intensity transformer can also be selected based on one or more relations between input exposure settings and output exposure settings, for example, an exposure ratio, a ratio between ISO settings, a ratio between shutter speeds, a ratio between aperture values, and so on.

A second aspect of the embodiment of the disclosure refers to an image transformation learning device. The device comprises a patch extraction unit configured to extract a plurality of source patches from a plurality of source training images and to extract a corresponding plurality of target patches from a plurality of target training images, wherein each of the source patches comprises two or more pixels of a respective one of the source training images and each of the target patches comprises one or more pixels of a respective one of the target training images, and a machine learning algorithm configured to learn an intensity transformation from the plurality of source patches and the corresponding plurality of target patches, wherein the plurality of source training images correspond to the plurality of target training images in that pairwise they have been acquired from a same scene, but with different exposures.

The image transformation learning device of the second aspect can be used to learn an image transformation that will then be used by the intensity transformer of the image processing device of the first aspect. This has the advantage that the intensity transformer can be trained to make better predictions based on "ground truth" training data.

The image transformation learning device can be implemented as a component of an image acquisition device, for example, a camera or a scanner. This has the advantage that the image transformation learning device can be trained with training images that were acquired with the image acquisition device. Thus, the machine learning algorithm can learn characteristics that are specific to the image acquisition device. For example, a camera might have noise characteristics at long exposure times that are specific to its camera sensor.

In other embodiments, the image transformation learning device can be implemented in a standard computer, where a standard image transformation is determined that can be used with any one of a plurality of cameras.

In a first implementation of the image transformation learning device of the second aspect, the image transformation learning device further comprises a correspondence identification unit configured to determine one or more regions in a target training image where the target training image and a corresponding source training image show the same scene (for example, by determining a binary mask that identifies one or more regions of movement between the source training image and the target training image), wherein the machine learning algorithm is configured to learn the image transformation based only on source patches and target patches extracted from regions that have been identified as showing the same scene.

Since the source and target training images are typically acquired sequentially, movement may have occurred in the scene. Thus, source and target images may have been acquired based on slightly different scenes and thus show slightly different scenes. This causes the problem that an inaccurate intensity transformation is learned based on the source and target training images. The image transformation learning device of the first implementation of the second aspect has the advantage that areas of non-correspondence can be identified and excluded from the training. Thus, an accurate intensity transformation can be learned even if no perfect ground truth training images are available.

In a second implementation of the image transformation learning device of the second aspect as such or according to the first implementation of the second aspect, the image transformation learning device is configured to learn the image transformation by optimizing a difference measure. The difference measure may be based on differences between intensities of output images generated from source training images and intensities of the corresponding target training images.

Because the source and target training images correspond to different exposure levels, their intensities cannot directly be compared. The image transformation learning device of the second implementation of the second aspect has the advantage that it can compare intensities of the generated output image with intensities of the acquired target image. A large difference between the intensities in the generated output image compared to the acquired target image may indicate that parameters of the image transformation have not yet converged and need to be improved.

In an embodiment, if the difference between predicted target image and acquired target image is bigger than a predetermined threshold, it is assumed that a change in the light field has occurred and the corresponding patches are not used for training the machine learning algorithm.

A third aspect of the embodiment of the disclosure refers to a method for learning an intensity transformation, the method comprising extracting a plurality of source patches from a plurality of source training images and extracting a plurality of corresponding target patches from a plurality of target training images, wherein each of the source patches comprises two or more pixels of a respective one of the source training images and each of the target patches comprises one or more pixels of a respective one of the target training images, and training a machine learning algorithm, in particular a convolutional neural network, with the plurality of source patches and corresponding target patches, wherein the plurality of source training images corresponds to the plurality of target training images in that pairwise they show a same scene, but have been acquired with different exposures.

The methods according to the third aspect of the embodiment of the disclosure can be performed by the image transformation learning device according to the second aspect of the embodiment of the disclosure. Further implementations of the method according to the third aspect of the embodiment of the disclosure can perform the functionality of the image transformation learning device according to the second aspect of the embodiment of the disclosure and its different implementation forms.

The intensity transformer of the first aspect can be configured to implement the intensity transformation that is learned using the method of the third aspect. Learning the intensity transformation can comprise determining a set of parameters that characterize the intensity transformation, for example weight and bias values of a neural network.

In a first implementation of the method for learning an intensity transformation of the third aspect, the method of the third aspect further comprises generating each of the training images by exposing an image sensor to a scene using a photographic camera.

This has the advantage that the machine learning algorithms is trained specifically for the image sensor of the photographic camera. The scene may also be referred to as training scene, since it is used for training the machine learning algorithm.

A fourth aspect of the embodiment of the disclosure refers to a method for generating from an input image, which is a first image of a scene, an output image, which is a second image of the scene, wherein the output image corresponds to an exposure that is different from an exposure of the input image, the method comprising determining one or more intensities of an output pixel, which is a pixel of the output image, based on an input patch around an input pixel, which is a pixel of the input image that corresponds to the output pixel, wherein in particular the determining the one or more intensities of the output pixel is performed using an intensity transformation that has been learned using the method of the third aspect or one of its implementations.

The methods according to the fourth aspect of the embodiment of the disclosure can be performed by the image processing device according to the first aspect of the embodiment of the disclosure. Further implementations of the method according to the fourth aspect of the embodiment of the disclosure can perform the functionality of the image processing device according to the first aspect of the embodiment of the disclosure and its different implementation forms.

A fifth aspect of the embodiment of the disclosure refers to a computer-readable storage medium storing program code, the program code comprising instructions for carrying out the method according to the third and fourth aspect or one of their implementations.

BRIEF DESCRIPTION OF THE DRAWINGS

To illustrate the technical features of embodiments of the present disclosure more clearly, the accompanying drawings provided for describing the embodiments are introduced briefly in the following. The accompanying drawings in the following description are merely some embodiments of the present disclosure, but modifications on these embodiments are possible without departing from the scope of the embodiment of disclosure as defined in the claims.

DETAILED DESCRIPTION OF THE EMBODIMENTS

In the following, image may refer to a visual representation of a real world or synthetic scene by a digital camera; also referred to as picture.

Pixel may refer to an elementary region of an image. An image may be composed of pixels. A pixel can be the smallest addressable picture/image element.

Pixel state may refer to the color and/or brightness of a pixel.

Patch may refer to a group of pixels (for example, a rectangular block of pixels) in an image or extracted from an image. Can be neighboring pixels, but this is not necessarily so (i.e., a patch can be coherent or non-coherent).

Patch state may refer to the pixel states of all the pixels of a patch. More precisely, the ordered set or tuple of the pixel states of the pixels of the patch.

Noise may refer to a random (not present in the captured scene) variation of brightness or color information in images.

Image histogram may refer to a graphical illustration of the distribution of the pixel color intensities of an image, or to the distribution itself.

Source image may refer to an image whose color distribution (or histogram) will be mapped to a reference during an exposure conversion operation.

Target image or may refer to an image whose color distribution (or histogram) will be used as a reference during an exposure conversion or other intensity transformation operation. The target image usually contains semantic differences in comparison to the source image.

Ground truth image may refer to a target image which does not contain semantic differences in comparison to the reference image. However it has the same color distribution as the target image.

Machine learning may refer to automated techniques of analyzing and learning from input data for the purpose of building a model capable of making predictions.

Artificial neural network may refer to a machine learning subfield in the context of deep learning, motivated by biological neural networks. Artificial networks aim at estimating functions with large number of inputs, by adaptively learning a set of connection weights.

Convolution may refer to a mathematical operation which computes the amount of overlap of 2 functions, one of them being reversed and shifted, using integral computation.

Convolutional neural network may refer to an artificial neural network which contains at east one convolutional layer in its architecture.

Feature map may refer to a map capturing the high level data abstractions or features in each layer of the convolutional network. A feature map is obtained by convolving a filter on sub-regions of the whole image.

Image de-noising may refer to the process of removing image noise in digital images.

Exposure may refer to the amount of light gathered by the capturing device example, a camera or scanner). A low-exposed image appears to be dark and a high-exposed image appears to be bright. Exposure typically does not include sensor sensitivity—sensitivity (see below) is a property of the sensor, not of the gathered light.

Exposure value (EV) may refer to a number that represents a combination of a camera's shutter speed and f-number, such that all combinations that yield the same exposure have the same EV value (for any fixed scene luminance).

Sensitivity may refer to the sensitivity of an image sensor (digital or film).

ISO may refer to a particular sensitivity scale. In the present application, ISO and sensitivity may sometimes be used synonymously.

Figure 1:
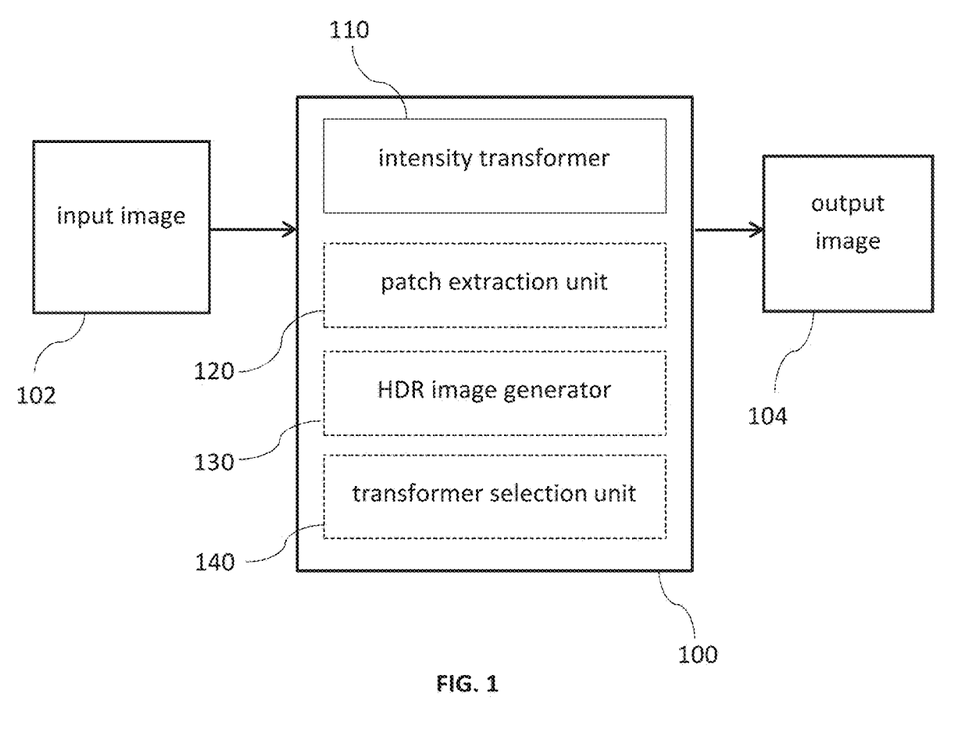
FIG. 1 is a block diagram illustrating an image processing device in accordance with an embodiment of the disclosure.

FIG. 1 shows an image processing device 100 for generating from an input image 102, which is a first image of a scene, an output image 104, which is a second image of the scene, wherein the output image corresponds to an exposure that is different from an exposure of the input image.

The image processing device comprises an intensity transformer 110.

The intensity transformer 110 is configured to determine one or more intensities of an output pixel of the output image, based on an input patch around an input pixel, which is a pixel of the input image that corresponds to the output pixel.

The image processing device 100 optionally (as indicated by the dashed lines) further comprises a patch extraction unit 120 which is configured to extract a plurality of input patches from the input image.

The image processing device 100 can optionally further comprise an HDR image generator 130 which is configured to generate an HDR image based on the input image and the output image.

Also, the image processing device 100 can optionally further comprise a transformer selection unit 140 which is configured to select a preferred intensity transformer from a plurality of intensity transformers based on exposure settings of the input image.

Figure 2:
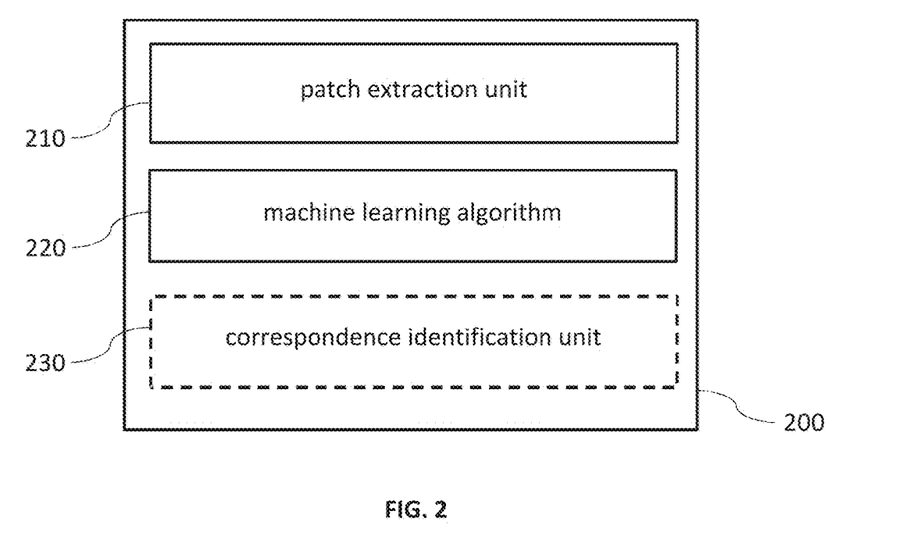
FIG. 2 is a block diagram illustrating an image transformation learning device in accordance with a further embodiment of the disclosure.

FIG. 2 shows an image transformation learning device 200.

The device comprises a patch extraction unit 210 and a machine learning algorithm 220. The patch extraction unit 210 is configured to extract a plurality of source patches from a plurality of source training images and to extract a corresponding plurality of target patches from a plurality of target training images.

The source and target training images can be grouped based on the kind of scenes shown therein. For example, a first group of training images can show nature scenes, wherein a second group of training images can show portraits.

The machine learning algorithm 220 is configured to learn an intensity transformation from the plurality of source patches and a corresponding plurality of target patches, wherein the plurality of source training images correspond to the plurality of target training images in that pairwise they have been acquired from a same scene but with different exposures.

If training images from different kinds of scenes are available, a plurality of intensity transformations can be learned, for example, a first intensity transformation for nature images and a second intensity transformation for portrait images.

The image transformation learning device can be implemented as a component of an image acquisition device, for example, a camera or a scanner. Alternatively, it can be implemented in a general purpose computer, and, for example, be used as a standard image transformation, for example, for use on a plurality of other devices (for example, other computers or other cameras).

Figure 3:
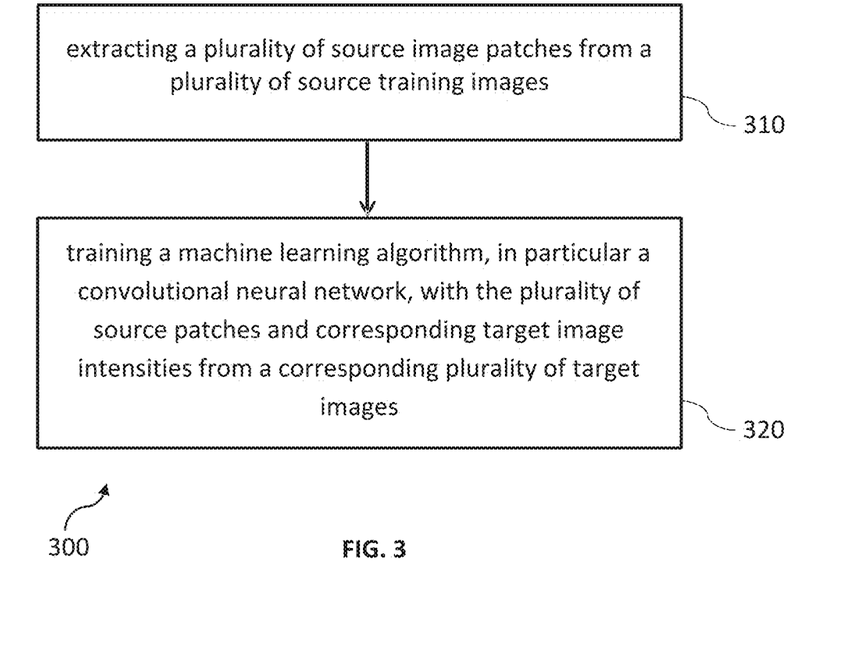
FIG. 3 is a flow chart of a method for learning an intensity transformation in accordance with an embodiment of the disclosure.

FIG. 3 is a flow chart of a method 300 for learning an intensity transformation.

The method comprises a first step of extracting 310 a plurality of source patches from a plurality of source training images. For example, for each pixel of a source training image, a source patch can be extracted (except possibly for border areas of the source training image). In other embodiments, source patches can be randomly sampled from the source training images.

The method comprises a second step of training 320 a machine learning algorithm with the plurality of source patches and corresponding target intensities from a corresponding plurality of target images, wherein the plurality of source training images corresponds to the plurality of target training images in that pairwise they show a same scene, but have been acquired with different exposures.

The intensity transformer of the first aspect can be configured to implement the intensity transformation that is learned using the method of the third aspect.

Learning the intensity transformation can comprise determining a set of parameters that characterize the intensity transformation, for example weight and bias values of a neural network.

Learning the intensity transformation can comprise fitting the intensity transformation, for example, parameters of the intensity transformation, to the set of training samples. In particular, this can involve fitting the intensity transformation so as to minimize a value of a measure of differences between the pixel states (Y_I (I=1, . . . , M) and corresponding intensity transformation results F(X_I).

The measure of differences can be defined, for example, as a sum of squares, for example, SUM_(I=1, . . . , M) ||(X_I)−Y_I|^2. If F and Y are vectors m an RGB color space, the sum can be determined as a sum of the intensity differences for each of the RGB color components.

Furthermore, fitting the intensity transformation can be performed by fitting a convolutional neural network, CNN, for example, fitting parameter vectors that define the CNN, for example, wherein the CNN is defined as F(X)=W*X+B.

The intensity transformation can also be defined as F(X)=max((W*X+B), 0) wherein W*X is the convolution and B is a bias value.

It is to be understood that the above are condensed formulas, wherein X and F can be single-dimensional values (for example, brightness of a pixel in a monochromatic image) or multi-dimensional values (for example, the three brightness values for red, green, and blue in an RGB image).

Figure 4:
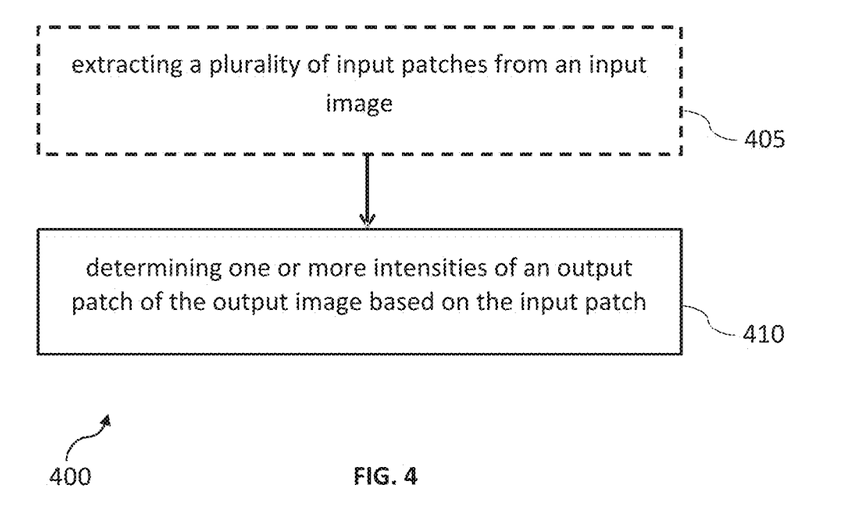
FIG. 4 is a flow chart of a method for generating from an input image an output image in accordance with a further embodiment of the disclosure.

FIG. 4 shows a method 400 for generating from an input image, which is a first image of a scene, an output image, which is a second image of the scene, wherein the output image corresponds to an exposure that is different from an exposure of the input image.

The method comprises a step 410 of determining one or more intensities of an output pixel of the output image, based on an input patch around an input pixel, which is a pixel of the input image that corresponds to the output pixel.

Preferably, the method further comprises a prior step 405 of extracting a plurality of input patches from an input image. For each of these extracted input patches, step 410 can be performed. Thus, for each pixel of the output image one or more intensities can be determined and an output image can be created whose dimensions correspond to the input image.

Preferably, the step of determining the one or more intensities of the output pixel is based on a machine learning algorithm that has been trained using a method for learning an intensity transformation, in particular the method 300 of FIG. 3.

Figure 5:
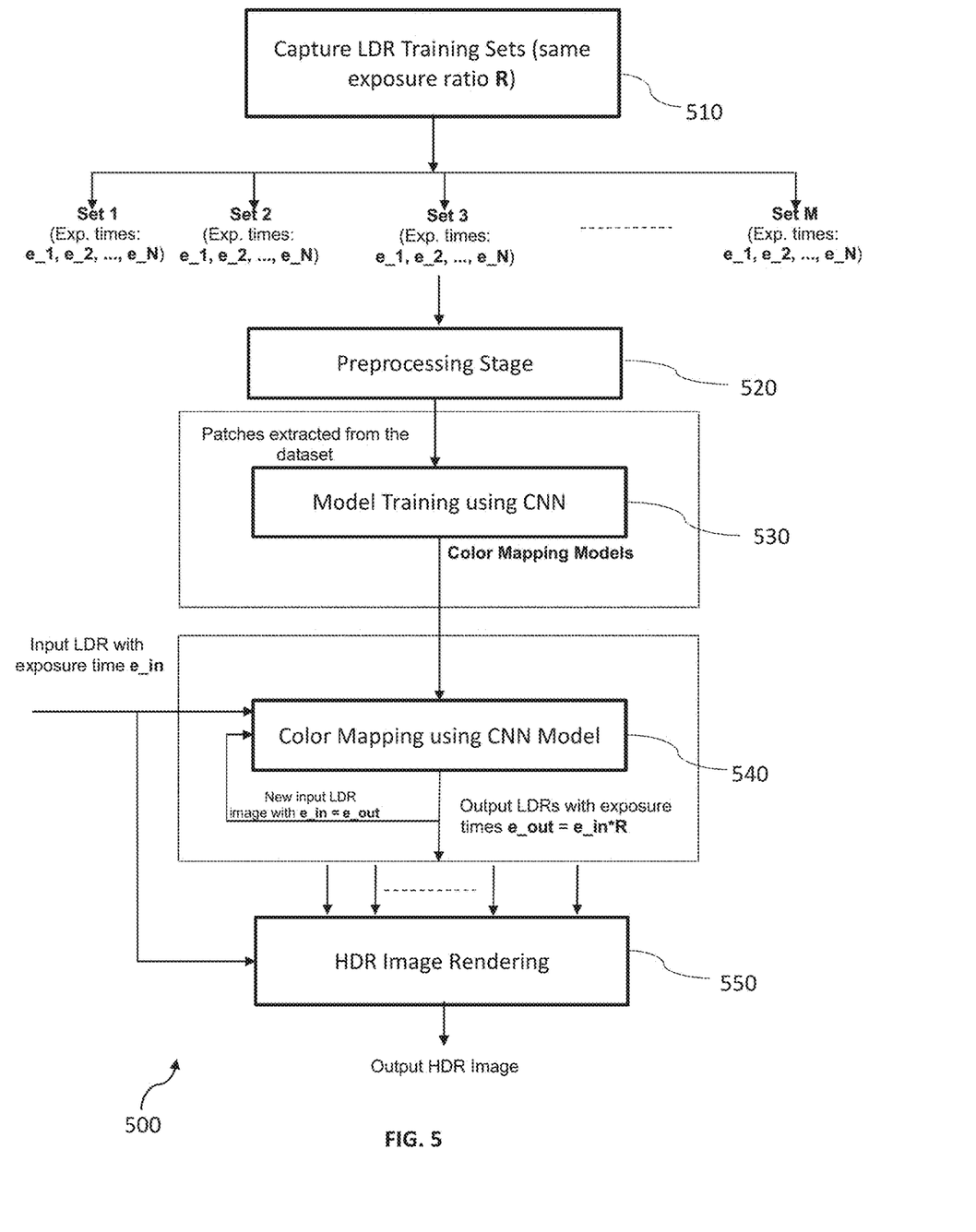
FIG. 5 is a flow chart of a method for generating an HDR image in accordance with a further embodiment of the disclosure, FIG. 6 schematically illustrates an exposure conversion operation during an application phase in accordance with an embodiment of the disclosure.

FIG. 5 is a flow chart of a method that comprises both a training phase of training a machine learning algorithm (for example, a CNN) and an application phase of applying the machine learning algorithm.

In a first step 510, several training sets, for example M sets, for the ensuing CNN-based learning stage, are captured. Each image set contains N multi-exposed low-dynamic range, LDR, images and depicts a different scene.

Each of the M captured sets of LDRs contains N differently exposed images of the same scene. As explained further below, cases where the input images contain some scene differences can also be dealt with by identifying correspondences in a separate step.

An exposure ratio between each successive pair of images in each set is equal to R. The exposure ratio is R>1 in case the exposure conversion aims at producing a brighter version of the input version and R<1 in the opposite case. In the following, the described steps of the proposed approach apply to the case where the exposure conversion results in a brighter image in each stage (from under-exposure to over-exposure).

The images contained in the captured dataset can be split into two categories: "source" and "target" images. The source images may also be referred to as data images or input images, and the target images may also be referred to as label or "ground truth" images. The exposure ratio between each pair of source and target images is equal to R.

In the second step 520, the input images are cropped into smaller sets of patches. When using a convolutional neural network, CNN, the size of source patches and target patches may be different due to the fact that no zero-padding in the convolutional layers of the networks is applied. The resulting patches may therefore be smaller than the input. Accordingly, the difference in size may depend on the architecture of network (number of convolutional layers, size and number of filters).

The processing of edge pixels can be different from the processing of pixels that are not near an edge of the image. In particular, edge pixels can be defined as pixels for which the associated reference patch would extend beyond the dimensions of the image.

In one embodiment, the intensity transformer can be reconfigured if an input patch is centered on an edge pixel. In this case, the intensity transformation F can be replaced by an edge pixel intensity transformation F_EDGE, for example, by re-renormalizing weight parameters of the intensity transformation.

In another embodiment, if the associated patch extends beyond the input image, those pixels of the patch that lie outside the input image can be "filled" with some suitable values, for example, by extrapolating or mirroring the image beyond its borders.

Optionally in step 520, in case the input images contain scene motion (target images are no longer considered as ground-truth), during the preprocessing stage, a motion detection algorithm is used in order to generate a binary mask which indicates the location of non-motion pixels and motion pixels. Next, the input images are cropped with consideration of the binary mask. This means that only patch pairs with no motion-pixels will be used for the subsequent training phase. Several motion detection algorithms can be applied for this purpose.

In third step 530, the training images (labeled as "source" and "target") are passed to the machine learning algorithm, where an end-to-end mapping model adapted to the exposure ratio R between source and target is learned. It is important to note that by training the network to R, models for further exposure conversions can indirectly be created, where the corresponding exposure ratio is an integer or fractional multiple of R.

The Convolutional Network may comprise three convolutional layers. It is possible to change the configuration of the network in order to have either more or less layers. However, modifying the number of convolutional layers might have a negative effect on the model quality and/or computational complexity. Each convolutional layer i of the network is composed of a set of $f\_i$ filters with a spatial size $s\_i*s\_i*c\_i$ (or $c\_i*s\_i*\_si$), with corresponding filter weights $W\_i$ and Biases $B\_i$. The set of weights and biases represent the network parameters which need to be learned during the training phase.

The patch sizes for source patches and target patches, number of filters $f\_i$ and the spatial size $s\_i$ may be provided by the user. Alternatively, these values can be set adaptively according to the exposure ratio of the training set. In case of a large exposure ratio, there exist large saturated areas (for example, over-exposed/bright or under-exposed/dark). The loss of texture in these areas might influence the mapping model negatively; therefore enlarging the patches size, filter numbers as well as spatial sizes helps reverse these effects. Additionally multiple networks with different architectures can be trained (for example, different patch sizes, number of filters and spatial size, etc.) for the ratio R. These CNN networks can be used during the subsequent application phase, where one network can be chosen adaptively according to the nature of the input image.

The network aims at iteratively estimating the set of parameters of each layer (for example, filter weights W and biases B) during the training phase so that the created exposure conversion model best fits the exposure ratio of the training data. Understandably, if many networks with different architectures are trained, the training phase will learn the parameters of each network separately. During each iteration, the network updates the set of filter weights $W=\{W\_1, W\_2, \ldots, W\_L\}$ and biases $B=\{B\_1, B\_2, \ldots, B\_L\}$ of the L convolutional layers, according to the current loss value. The loss is computed by comparing the predicted mapped images, based on the current instances of filter weights and biases, and the labels (for example, ground-truths). Next, the error loss is back-propagated through the network and used to update the network parameters using stochastic gradient and a user pre-defined learning rate η.

The training is executed on RGB pairs of patches (source and target). Alternatively, the models can be trained on a single color channel (for example, grayscale images) or in different color spaces such as Lab, YCbCr.

The training steps described so far correspond to the case where e_in <e_out and thus R>1 (output image is brighter than input). However, it is possible to train a model which outputs a darker image, so that e_in >e_out and thus R<1.

Figure 6:
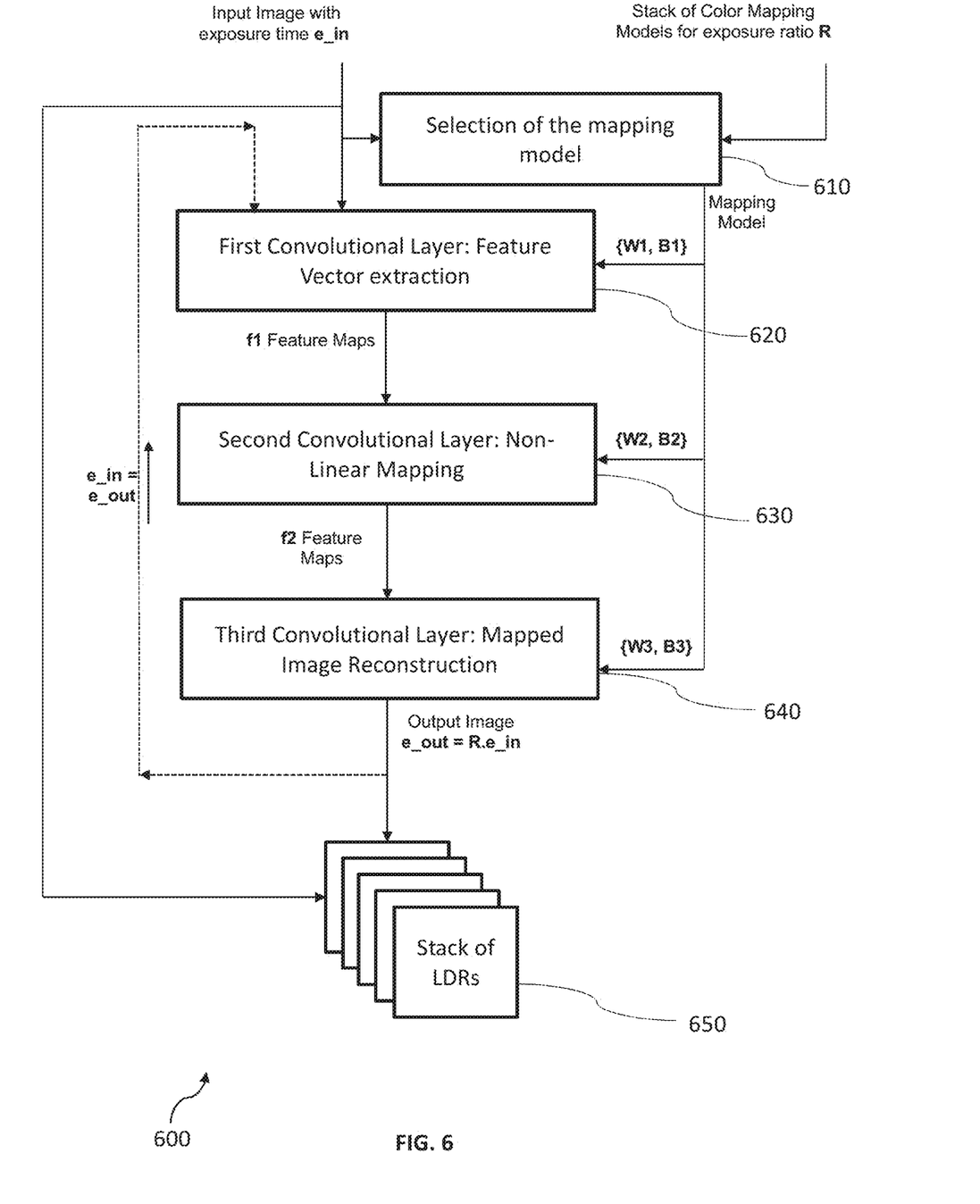

FIG. 6 is a flow chart of the method steps of block 540 of FIG. 5, for example, the application phase of exposure conversion using the CNN model. The inputs to this block are the input image with exposure time e_in and the stack of color models for the exposure ratio R, as obtained, for example, using the training in step 530 of the method of FIG. 5.

In a first step 610, in case multiple models for the exposure ratio R were trained, a model is chosen out of the stack for the subsequent application phase. The choice of the model is based on the characteristics of the input image (for example, amount of texture, level of saturation, exposure time of the input image . . . ).

In a second step 620, the first convolutional layer of the proposed network extracts an f1 dimensional feature vector for every s1*s1*3 patch from the input image (for example, that corresponds to the kernel size of the each filter) using the trained weights and biases. This results in f1 feature maps which summarize the high dimensional color properties of the input image. The first convolutional layer is followed by an activation function using Rectified Linear Unit (ReLu), f(x)=max(0,x)). The equation of the convolutional layer is defined as F_1(X)=max((W_1*X+B_1), 0), where X is the patch from the input image under processing and * is the convolution operator (for example, the convolution of two discrete functions f and g is defined as f*g[x]=$\Sigma_i$f[i]g[x−i]).

In a third step 630, a non-linear transformation is applied on the f1 feature maps using a set of f2 filters with a kernel size equal to f1*s2*s2, based on the previously trained filter weights. This results in a set of f2 feature maps. This layer is completed with a ReLu activation function applied on the output of the convolutions.

Next, in a fourth step 640, the final color mapped image is reconstructed by using 3 filters (for example, corresponding to the number of color channels) of size f2*s3*s3. The created output image corresponds to an exposure e_out=e_in*R.

An instance of the output image is passed again to the CNN as an input image, in order to generate an additional LDR image with a greater exposure time (or smaller, depending on the trained exposure ratio: R>1 or R<1). The number of output images is controlled by the user.

Figure 8:
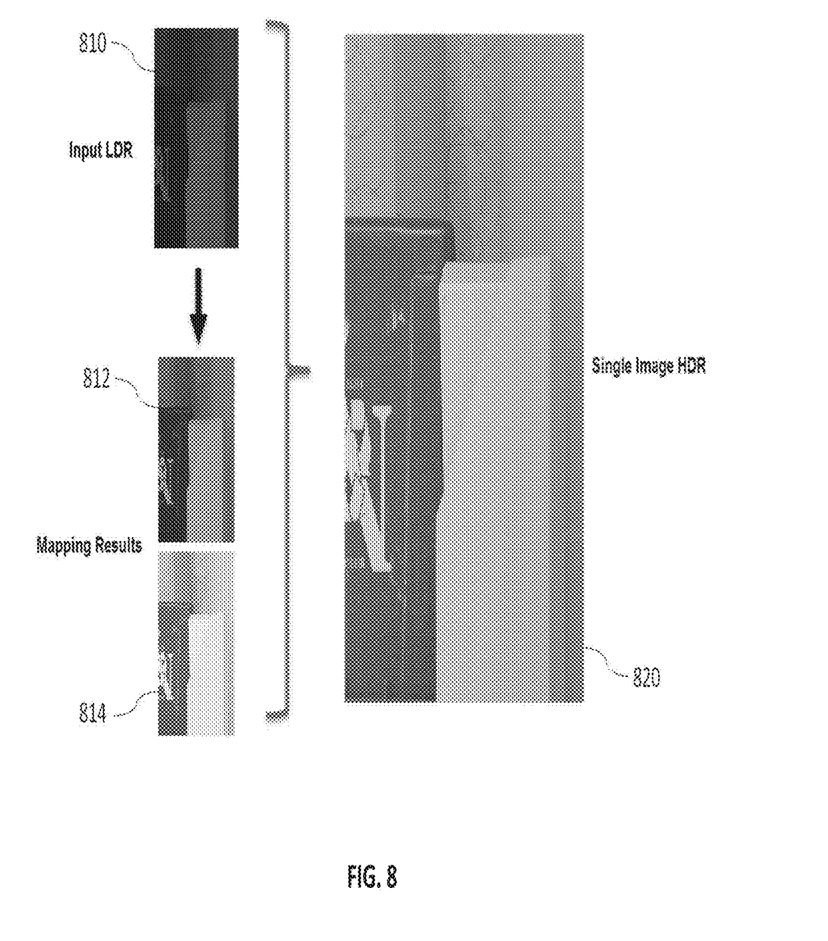
FIG. 8 shows a single HDR Image (using EF) using LDR images generated using the proposed CNN-based exposure conversion.

In fifth step 550 of the method of FIG. 5, the input image and the generated color mapped output images are merged to obtain a final HDR image. There exist several approaches to generate the HDR image. For example, the stack of LDRs could be used to estimate the CRF. Using the estimated CRF, the LDRs are transformed into the irradiance domain, then into a single HDR. Alternatively, the stack of LDR images can be merged directly into a single image with a greater dynamic range using Exposure Fusion, as shown in FIG. 8.

Figure 7:
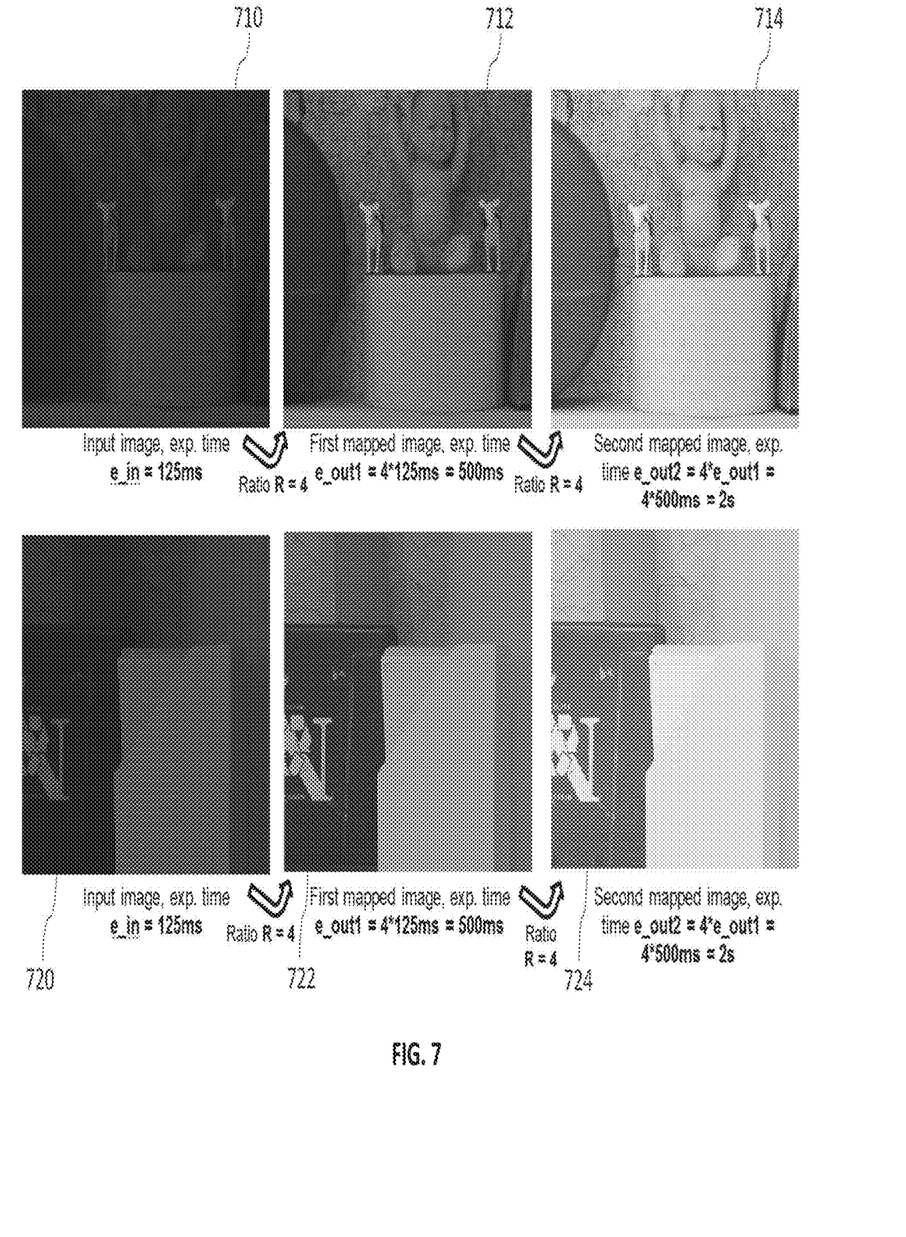
FIG. 7 shows two examples of exposure conversion results for an Exposure Ratio R=4.

FIG. 7 shows two examples of exposure conversion using a mapping model trained for an exposure ratio R=4.

The first example comprises an input image 710 that has been acquired with an exposure time e_in=125 ms. From this input image a first output image ("first mapped image") 712 is generated. The first output image corresponds to an exposure time of e_out1=4*125 ms=500 ms. Using the first output image as an input for the intensity transformation, a second output image ("second mapped image") 714 is generated. The second output image corresponds to an exposure time of e_out2=4*500 ms=2 s.

The images 720, 722, 724 of the second example show a different scene, but have the same exposure values and are determined in the same way as the first example.

FIG. 8 illustrates an example of obtaining a single HDR image based on only one input LDR image 810. Based on the first input LDR image 810, a first and a second output image 812, 814 ("mapping results") are generated. The input LDR image 810 and the mapping results 812, 814 are provided as inputs to an UDR image generation algorithm, thus yielding a single HDR image 820.

Figure 9:
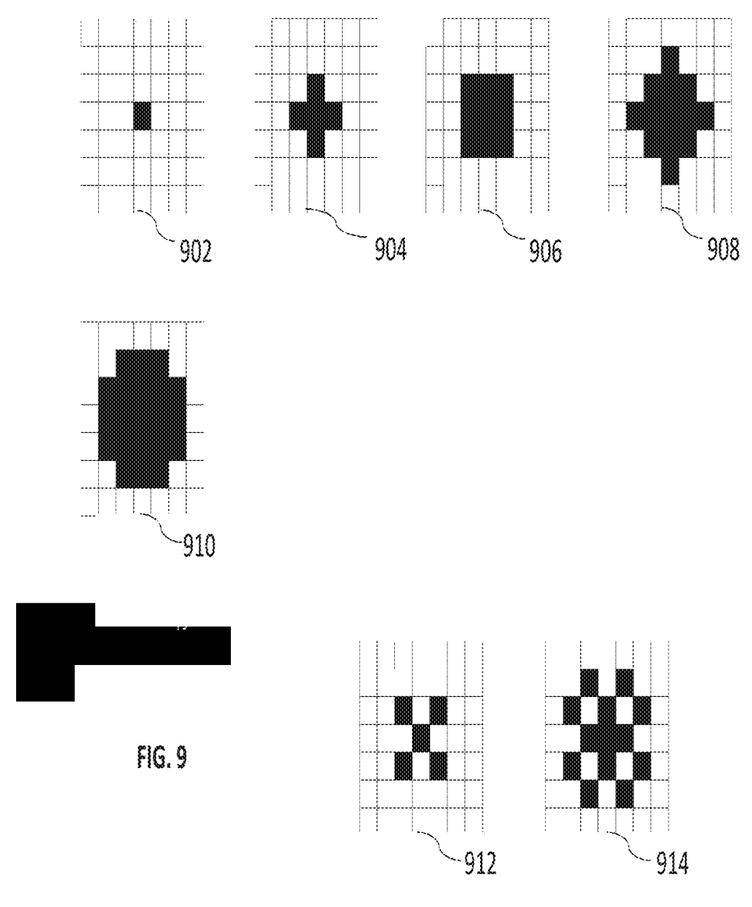
FIG. 9 shows examples of possible patch geometries.

FIG. 9 illustrates a plurality of patch shapes. A first patch shape 902 comprises only the center pixel. A second patch shape 904 comprises the center pixel and its four nearest neighboring pixels. A third patch shape 906 comprises a rectangular block of 9 pixels, centered on the center pixel. A fourth patch shape 908 comprises the center pixel and its 8 nearest neighbors. Further patch shapes are possible, for example, the blob-like arrangement of a fifth patch shape 910.

In general, a patch shape may comprise all of the N-th-closest neighbors, wherein N is greater than 1, for example, N<5 or N<10 or N<20.

Further patch shapes 912, 914 may be "incoherent" in the sense that they enclose pixels that are not part of the patch shape.

A suitable patch shape can be chosen based on properties of the input images, for example, based on a texture of the input image.

Selecting a patch shape based on properties of the input image can be performed as follows. The steps include defining a set of two or more candidate shapes; for each candidate shape, computing a texture value based on the input image; and selecting the patch shape having the greatest texture value. Therein, computing the texture value of a candidate shape can comprise, for each pixel of the input image, defining a texture evaluation patch by centering the candidate shape on that pixel, then computing a texture value of the texture evaluation patch; averaging the thus obtained texture values of the pixels of the input image to obtain the texture value of the candidate shape.

As outlined above, some embodiments of the present disclosure relate to exposure conversion using machine learning, in particular using a convolutional neural network, CNN. The CNN can learn an end-to-end non-local mapping and yields a model which takes into consideration the neighborhood distribution of each pixel during the mapping operation.

As outlined above, example applications of the above methods for generating an output image from input image include changing the brightness, i.e., the output image will be darker or brighter than the input image, for example, in accordance with a specific exposure ratio R.

The changes of settings between input and output images are not limited to exposure time, for example an ISO value may also be changed. The following are examples of settings of the input and output images.

In Example 1 (with change of EV, ISO stays the same), the input settings are ISO 100, EV 12 (for example, 1/125 s, aperture 5.6); output settings are ISO 100, EV 13 (for example, 1/125 s, aperture 8), hence R=½, output image will be darker than input image;

In Example 2 (with change of EV, ISO stays the same), the input settings are ISO 100, EV 12 (for example, 1/125 s, aperture 5.6); output settings are ISO 100, EV 11 (for example, 1/125 s, aperture 4), hence R=2, output image will be brighter than input image;

In Example 3 (with change of ISO), input settings are ISO 800, EV 8 (for example, 1/15 s, aperture 4); output settings are ISO 100. EV 8 (for example, 1/15 s, aperture 4), hence R=1/8, output image will be darker than input image.

The exposure ratio R between input and output image may in particular be one of 1/4, 1/2, $2^{-1/2}$, $2^{-1/3}$, $2^{1/3}$, $2^{1/2}$, 2, and 4.

In an example, the source and target training images are generated experimentally, for example, by exposing a sensor to a light field with first exposure settings, thus causing a patch of the sensor to assume a first patch state. Subsequently, the sensor can be exposed to the same or a similar light field with second exposure settings, thus causing the patch to assume a second patch state (for example, causing a selected center pixel of the patch to assume a second pixel state). The first patch state can form part of the source training images and the second patch state can form part of the target training images.

An embodiment of the disclosure relates to non-local exposure conversion between differently exposed images using convolutional neural network-trained model, comprising one or more of the following steps. Training an exposure conversion model in order to estimate the network parameters which fit the exposure ratio introduced by the training set, adaptive selection of CNN network according to some preprocessing of the input image, adaptive exposure conversion model according to the distribution of the neighboring pixels, adaptive choice of the exposure ratio which needs to be trained, and applying the trained model on the input LDR as well as on the intermediate output mages in order to create several instances of the input LDR with different exposure time.

The foregoing descriptions are only implementation manners of the present disclosure, and the scope of the present disclosure is not limited to this. Any variations or replacements can be easily made through person skilled in the art. Therefore, the protection scope of the present embodiment of the disclosure should be subject to the protection scope of the attached claims.

The invention claimed is:

1. An image processing device for processing an input image into an output image, comprising:
a memory comprising instructions; and
a processor coupled to the memory, wherein the instructions cause the processor to be configured to:
determine one or more intensities of an output pixel based on an input patch, wherein the output pixel comprises first intensities that correspond to color components of the output pixel, wherein the input image comprises the input patch comprising an input pixel and one or more additional pixels and the output image comprises the output pixel, wherein the input image is a first image and the output image is a second image, wherein the input pixel corresponds to the output pixel, and wherein the output image comprises a second exposure and the input image comprises a first exposure;
determine each of the first intensities separately based on second intensities that correspond to all color components of pixels of the input patch around the input pixel; and
generate the output image from the input image, wherein the second exposure is different than the first exposure.

2. The image processing device of claim 1, wherein the instructions further cause the processor to be configured to determine the one or more intensities of the output pixel using intensity transformation data, wherein the intensity transformation data is generated by training a machine learning predictor with source patches from source training images and target patches that correspond to target training images, and wherein a first ratio between the first exposure and the second exposure corresponds to a second ratio between exposures of the source training images and exposures of the target training images.

3. The image processing device of claim 1, wherein the instructions further cause the processor to be configured to implement a convolutional neural network.

4. The image processing device of claim 2, wherein the instructions further cause the processor to be configured to implement a convolutional neural network.

5. The image processing device of claim 1, wherein the input patch comprises the input pixel and its closest neighbors up to and including its N-th closest neighbors, and wherein N is a predetermined number greater than 1.

6. The image processing device of claim 2, wherein the input patch comprises the input pixel and its closest neighbors up to and including its N-th closest neighbors, and wherein N is a predetermined number greater than 1.

7. The image processing device of claim 3, wherein the input patch consists of the input pixel and its closest neighbors up to and including its N-th closest neighbors, and wherein N is a predetermined number greater than 1.

8. The image processing device of claim 4, wherein the input patch consists of the input pixel and its closest neighbors up to and including its N-th closest neighbors, and wherein N is a predetermined number greater than 1.

9. The image processing device of claim 1, wherein the instructions further cause the processor to be configured to generate a high dynamic range (HDR) image based on the input image and the output image.

10. The image processing device of claim 2, wherein the instructions further cause the processor to be configured to generate a high dynamic range (HDR) image based on the input image and the output image.

11. The image processing device of claim 3, wherein the instructions further cause the processor to be configured to generate a high dynamic range (HDR) image based on the input image and the output image.

12. The image processing device of claim 4, wherein the instructions further cause the processor to be configured to generate a high dynamic range (HDR) image based on the input image and the output image.

13. The image processing device of claim 1, wherein the instructions further cause the processor to be configured to generate a darker output image that corresponds to a shorter exposure time than the input image and a brighter output image that corresponds to a longer exposure time than the input image.

14. The image processing device of claim 2, wherein the instructions further cause the processor to be configured to select intensity mapping for the input image based on exposure settings of the input image.

15. An image transformation learning device, comprising:
a memory comprising a machine learning algorithm with instructions; and
a processor coupled to the memory, wherein the instructions cause the processor to be configured to:
extract source patches and target patches from image pairs, wherein each image pair comprises a source training image and a target training image, wherein the source training image and the target training image are two photographs of a same scene, wherein the target training image has an exposure different from an exposure of the source training image, and wherein each of the source patches comprises two or more pixels of a respective one of the source training images and each of the target patches comprises one or more pixels of a respective one of the target training images; and learn an intensity transformation using a machine learning algorithm comprising a convolutional neural network with the source patches and the target patches.

16. The image transformation learning device of claim 15, wherein the instructions further cause the processor to be configured to:

determine one or more regions in a target training image in which the target training image and a source training image show the same scene by determining a binary mask that identifies one or more regions of movement between the source training image and the target training image; and learn an image transformation based only on source patches and target patches extracted from regions that have been identified as showing the same scene.

17. The image transformation learning device of claim 15, wherein the instructions further cause the processor to be configured to learn an image transformation by optimizing a difference measure, wherein the difference measure is based on differences between intensities of target images predicted from source training images and intensities of corresponding target training images.

18. A method for learning an intensity transformation, comprising:

extracting source patches from source training images, wherein each of the source patches comprises two or more pixels of a respective one of the source training images;

extracting target patches from target training images, wherein each of the target patches comprises one or more pixels of a respective one of the target training images, and wherein the source patches correspond to the target patches; and training a machine learning algorithm comprising a convolutional neural network with each of the source patches and each of the target patches, wherein the source training images correspond to the target training images as a pair based on a same scene, and wherein the source training images that correspond to the target training images have been acquired with different exposures.

19. The method of claim 18, further comprising generating each target training image and each source training image by exposing an image sensor to a scene using a photographic camera.

* * * * *

UNITED STATES PATENT AND TRADEMARK OFFICE
CERTIFICATE OF CORRECTION

PATENT NO. : 10,666,873 B2
APPLICATION NO. : 15/954941
DATED : May 26, 2020
INVENTOR(S) : Fahd Bouzaraa and Onay Urfalioglu Page 1 of 1

It is certified that error appears in the above-identified patent and that said Letters Patent is hereby corrected as shown below:

On the Title Page

Item (57), Abstract, Second Line: "front an input image" should read "from an input image"

Signed and Sealed this
Fourteenth Day of July, 2020

Andrei Iancu
*Director of the United States Patent and Trademark Office*